(12) United States Patent
Niu et al.

(10) Patent No.: US 11,180,400 B2
(45) Date of Patent: Nov. 23, 2021

(54) MULTI-EFFECT ENERGY-SAVING APPARATUS FOR POLLUTION CONTROL AND UTILIZATION OF PETROCHEMICAL WATER

(71) Applicants: South China University of Technology, Guangzhou (CN); Guangdong University of Petrochemical Technology, Maoming (CN); Guangzhou Yuyue Ecological Environment Technology Co., Ltd., Guangzhou (CN); Maoming Gravity Petrochemical Equipment Co., Ltd., Maoming (CN); Sino-Singapore International Joint Research Institute, Guangzhou (CN)

(72) Inventors: Xiaojun Niu, Guangzhou (CN); Zhang Lin, Guangzhou (CN); Dehao Li, Maoming (CN); Lihua Cheng, Maoming (CN); Hong Deng, Guangzhou (CN); Xingyao Ye, Guangzhou (CN); Xiuying Wang, Maoming (CN); Heng Liu, Maoming (CN); Huilin Li, Maoming (CN); Yu Wang, Maoming (CN)

( * ) Notice: Subject to any disclaimer, the term of this patent is extended or adjusted under 35 U.S.C. 154(b) by 0 days.

(21) Appl. No.: 16/716,974

(22) Filed: Dec. 17, 2019

(65) Prior Publication Data
US 2021/0179464 A1    Jun. 17, 2021

(51) Int. Cl.
| | |
|---|---|
| *C02F 9/00* | (2006.01) |
| *C02F 1/04* | (2006.01) |
| *C02F 1/52* | (2006.01) |
| *C02F 1/44* | (2006.01) |
| *C02F 103/36* | (2006.01) |

(52) U.S. Cl.
CPC ............... *C02F 9/00* (2013.01); *C02F 1/048* (2013.01); *C02F 1/44* (2013.01); *C02F 1/52* (2013.01); *C02F 2103/365* (2013.01); *C02F 2201/004* (2013.01); *C02F 2201/005* (2013.01); *C02F 2201/006* (2013.01); *C02F 2201/009* (2013.01); *C02F 2209/005* (2013.01); *C02F 2209/03* (2013.01); *C02F 2209/40* (2013.01)

(58) Field of Classification Search
None
See application file for complete search history.

(56) References Cited

U.S. PATENT DOCUMENTS

| | | | | |
|---|---|---|---|---|
| 4,734,159 A | * | 3/1988 | Korenowski | ............ B01D 1/00 159/16.1 |
| 5,032,287 A | * | 7/1991 | Salmond | ................ B01D 29/66 210/737 |
| 2013/0240442 A1 | * | 9/2013 | Chidambaran | ........... C02F 9/00 210/638 |

FOREIGN PATENT DOCUMENTS

| | | |
|---|---|---|
| CN | 202215695 U | 5/2012 |
| CN | 107827294 A | 3/2018 |

* cited by examiner

*Primary Examiner* — Matthew O Savage
(74) *Attorney, Agent, or Firm* — W&KIP

(57) ABSTRACT

A multi-effect energy-saving apparatus for pollution control and utilization of petrochemical water, has a multi-effect treatment device, a post-treatment device, a first loading head, a second loading head, and a third loading head, by combined assembly of devices, the apparatus is simple to disassemble and easy to clean, meanwhile due to the controllable addition of treating agent by using a multi-effect regulator, a fluid outlet connecting member and other components, it is energy-saving and multi-effective, and has excellent treatment effect.

10 Claims, 11 Drawing Sheets

MULTI-EFFECT ENERGY-SAVING APPARATUS FOR POLLUTION CONTROL AND UTILIZATION OF PETROCHEMICAL WATER

TECHNICAL FIELD

The invention relates to the technical field of water pollution control, in particular to a multi-effect energy-saving apparatus for pollution control and utilization of water from petrochemical industry.

BACKGROUND OF THE INVENTION

Petrochemical wastewater refers to that discharged from petrochemical plants, which has a large amount of wastewater and complex components. Due to the large number of petrochemical products, the reaction process and unit operation are complex, the nature of wastewater is complex and variable; the organics, especially hydrocarbons and their derivatives, is high in content in wastewater and contains many heavy metals. Petrochemical wastewater, which has a variety of types, is mainly divided into sulfur-containing wastewater, alkali-containing wastewater, salt-containing wastewater and phenol-containing wastewater. There are not much comprehensive treatment devices that are multi-effect energy-saving in the prior art, and the waste of energy from treatment for petrochemical wastewater in the prior art is more serious.

If the "targeted" treatment is carried out according to the main content of each wastewater, the addition of treating agent corresponding to the petrochemical wastewater by the device will not only improve the efficiency of wastewater treatment, but also save the addition of the treating agent. Therefore, there is a need for a multi-effect energy-saving apparatus to control the petrochemical water pollution to solve the above problems.

SUMMARY OF THE INVENTION

In view of the problems existing in the prior art, the invention provides a multi-effect and energy-saving apparatus for controlling and utilizing petroleum water pollution.

The technical solution of the invention is a multi-effect energy-saving apparatus for pollution control and utilization of petrochemical water, comprising:

a first loading head for collecting wastewater, storing energy and classifying and is provided at the bottom with an upper mounting fitting groove for connecting with the upper end of a multi-effect treatment device, and the first loading head is provided at the center with a central rod, which is sequentially provided from top to bottom with a spiral water guiding piece for collecting wastewater and accelerating the flow of the wastewater and a rotating blade for rotating with the flow force of the wastewater for a multi-effect regulator to store energy, and a lower outlet of the spiral water guiding piece is provided with a restricting piece for collecting the flow, the restricting piece is provided at the position corresponding to the rotating blade with a restricting port for guiding and accelerating the wastewater by the spiral water guiding piece, to improve the rotating efficiency of the rotating blade, thereby improving the energy storage efficiency of the spring accumulator, effectively saving energy, and controlling the addition of treating agent by using the water flow potential energy and flow rate, the central rod is provided at the upper end with a first water pollution detecting sensor for detecting wastewater and determining the classification of the wastewater, the classification process is highly intelligent, highly automatic, the use is simple and effective, and the first loading head is sequentially provided at its circumference with a first, second, third, and fourth water control chamber for opening the corresponding chamber according to the classification of the wastewater, and the first loading head is sequentially provided at its inner side with a first, second, third and fourth interface for docking with the corresponding inlets of the multi-effect treatment device, a multi-effect treatment device connected to the lower end of the first loading head for classifying the wastewater, and the multi-effect treatment device is arranged at the positions of the outer upper end corresponding to the first, second, third and fourth interface with the first, second and third and fourth inlets respectively, and is correspondingly provided with a first, second, third and fourth water guiding chamber for the corresponding types of wastewater to flow into the corresponding reaction chambers, which fall into the corresponding reaction chambers for the corresponding treating agents to react to improve the wastewater treatment efficiency, a multi-effect regulator located above the multi-effect treatment device for releasing the corresponding treating agent according to the type of wastewater, a central cartridge located in the lower center of the multi-effect treatment device, and divides the lower portion of the multi-effect treatment device equally into a first, second, third and fourth reaction chamber through partition plates, and the lower end of the multi-effect treatment device is respectively provided with a primary filter for primary filtrating and purifying the wastewater, the central wall below the primary filter are respectively provided with secondary filters for secondary filtrating and purifying the wastewater, the secondary filters are placed on the central wall to improve time for falling travel and aeration of wastewater such that the processing effect is better, a post-treatment device connected to the lower end of the multi-effect treatment device, and is provided at the top center with a lower mounting fitting groove for connecting with the lower end of the multi-effect treatment device, and the post-treatment device is provided at the center with an evaporation device for evaporating and purifying the wastewater, and at the upper right end with a steam outlet pipe communicating with the outside, and the bottom surface of the evaporation device is provided with a heating plate for heating, and water inlet holes are uniformly arranged at the circumference of the lower bottom of the evaporation device, so that the wastewater can uniformly entered the evaporation device and the evaporation effect of the evaporation device can be improved, the post-treatment device is provided on the upper portion with an aeration plate, which is connected to and rotated with the upper top surface of the evaporation device by a central motor at the center, and communicates with an interior of the evaporation device through an annular groove for falling water provided at outer circumference of the aeration plate, the annular groove for falling water is provided to effectively utilize the gravity potential energy of the wastewater, so that the wastewater naturally enters the steam treatment stage after the aeration treatment, and is energy saving and effective, and the post-treatment device is provided on the left side of the top surface with an aeration pump for communicating with the aeration plate by an air guiding pipe at the left side of the aeration plate, the aeration plate is in the form of a truncated cone, and conducts rotational aeration by the central motor, such that the aeration of the wastewater can be improved and the wastewater treatment effect can be improved, a controller connecting to the front side of the multi-effect treatment device for data connection with various components in the apparatus.

According to an aspect of the invention, a spring accumulator is provided in the upper center of the multi-effect regulator for storing the kinetic energy from the rotation of the rotating blade, and the space between the spring accumulator and the inner wall of the multi-effect regulator is divided equally into first, second, third and fourth agent storage chambers. The water potential energy is stored by using the spring accumulator, which is simple and effective, economical, energy-saving and environmentally friendly, and easy to promote and use, four stirring bevel gears respectively corresponding to the positions of the first, second, third and fourth agent storage chambers are arranged on the bottom surface of the multi-effect regulator for driving the stirring rod assembly to rotate, the upper ends of each of the stirring rod assemblies are respectively connected to the first, second, third and fourth agent storage chambers by a fluid outlet connecting member 6 disposed on the bottom surfaces thereof, the stirring rod assembly is hollow inside, and a spiral stirring rod is fixedly connected to the lower end thereof, the energy storage of the spring accumulator is released by a built-in mechanism of the multi-effect regulator, such that the stirring bevel gear is rotated, and the reaction chamber is stirred and the treating agent is added, this process does not require power supply, is energy saving and effective, a fluid outlet for releasing the treating agent is provided on the surface of the stirring rod assembly above the spiral stirring rod, and a fluid conduit for guiding is provided outside the stirring rod assembly, the spring accumulator is connected by its upper input shaft with the rotating blade, and is provided at the lower bottom surface with a main bevel gear, a rotating motor for rotation is provided at the center of the inner bottom surface of the multi-effect regulator located below the spring accumulator, and the left side of the rotating motor is connected with the telescopic motor rod disposed between the main bevel gear and the stirring bevel gear by the connecting rod, and the left end of the telescopic motor rod is transmitted to the stirring bevel gear by the left driven bevel gear and the right end of the telescopic motor rod is transmitted to the main bevel gear by the right driven bevel gear, the telescopic motor rod is used for controlling the occlusion transmission, and by using the transmission between the main bevel gear, the telescopic motor rod, the left driven bevel gear and the right transmission bevel gear, the energy storage is released from the spring accumulator and the treating agent corresponding to the number of revolutions of the energy storage is released, and the release of the corresponding dosage of the treating agent can be performed according to the flow rate of wastewater. This process does not require power supply, is energy-saving and effective, and can save the addition of the treating agent, and a stop motor rod is provided at the top surface of the rotating motor to stop the main bevel gear so as to store energy by the spring accumulator, which can effectively prevent the invalid release of the energy storage from the spring accumulator, thus influencing the efficiency and effectiveness of the wastewater treatment control.

According to an aspect of the invention, the fluid outlet connecting member comprises an upper fixing plate, a lower fixing plate and a fluid-control collar. The upper fixing plate is fixedly connected to the top surface of the stirring rod assembly, and the lower fixing plate is fixed to the bottom surface of the agent storage chamber, and its inner side surface is respectively provided with an upper guiding ring and a lower guiding ring. The fluid-control collar is located between the upper guiding ring and the lower guiding ring for controlling the release of the treating agent. A plurality of fluid inlets are evenly distributed on the upper outer peripheral wall of the stirring rod assembly for flowing the treating agent into the stirring rod assembly through the fluid inlets, and a first magnetic strip fitting for the fluid-control collar is disposed below the fluid inlets, the inner side surface of the fluid-control collar is provided with a sealing piece and a second magnetic strip corresponding to the position of the fluid inlets and the first magnetic strip, the fluid-control collar may be restore to a fluid blocking status in a normal state by the magnetic force cooperation between the first magnetic strip and the second magnetic strip, the structure is simple and effective, and the use effect is good, neodymium iron boron magnet is selected for the first magnetic strip and the second magnetic strip, a fluid passing port is provided between each two seals for docking with the fluid inlets to flow the treating agent into the stirring rod assembly, the top surface and the lower bottom surface of the fluid-control collar are respectively provided with a sliding slot, the sliding slot is matched with the slider provided at the corresponding position of the upper guiding ring and the lower guiding ring for docking with the fluid passing port and the fluid inlets by the stopping point that allowing the rotation of the fluid-control collar, such that an effect of fluid discharge in rotary status and fluid blocking in static status is realized by the cooperation of the fluid-control collar with the upper guiding ring and the lower guiding ring. By the structure of the apparatus, the electro-mechanical dependence is small, and is energy saving and effective, the use effect is good, and the release control of the treating agent is stable.

According to an aspect of the invention, the first loading head of the upper end of the multi-effect treatment device can also be replaced by a second loading head, and a first control motor is provided at the center of the bottom surface of the second loading head, and the top central surface of the first control motor is provided with a second water pollution detecting sensor, and a first water pressure sensor for detecting a water storage pressure is disposed outside the circumference of the second water pollution detecting sensor, and the first control motor is configured to perform control of energy storage amount of the spring accumulator according to the collected data, the second loading head is provided with first, second, third and fourth water control chambers for opening the corresponding chamber according to the classification of wastewater, and the first, second, third and fourth interface are respectively arranged on the inner side thereof for docking with the corresponding water inlet of the multi-effect treatment device. The second loading head is used for the wastewater of poor flowability, and by the pre-storage and then treatment, the reaction error of the multi-effect treatment device is reduced, so that the wastewater of poor flowability can be efficiently treated by the present apparatus.

According to an aspect of the invention, the first loading head at the upper end of the multi-effect treatment device is also replaceable with a third loading head, a bottom central surface of the third loading head is provided with a second control motor for performing control of energy storage amount of the spring accumulator according to the collected data, the third loading head is provided on outer circumference with a first, second, third and fourth water control chamber for opening the corresponding chamber according to the classification of the wastewater, and on the inner side, with a first, second, third and fourth interface for docking with the corresponding water inlet of the multi-effect treatment device, and a space inside the third loading head is divided into a first, second, third and fourth water storage chambers according to the corresponding positions of the first, second, third and fourth water control chamber, contact surfaces between the second control motor and the first, second, third and fourth water storage chambers are provided with a second water pressure sensor for detecting the water storage pressure, and the first, second, third and fourth water control chamber is provided with a filter respectively for filtering large particle impurities in the wastewater. The third loading head is used for the main content of the known wastewater, conducting the discharge of the corresponding chamber, such that the part of water pollution detection is saved, the processing steps and the calculation amount of the controller are simplified, is energy saving and effective, and the known wastewater can be efficiently processed. At the same time, the first control motor and the second control motor perform the rotation of the corresponding dosage of the spring accumulator by the monitoring result of the water pressure sensor, and the dosage of the treating agent can be controlled.

As an improvement, the upper end of the first loading head and the second loading head are provided with a filter cover for filtering large particles of impurities in the wastewater. The provision of the filter cover can effectively prevent large particle impurities and the like from causing congestion in the subsequent procedures and improve the effect of wastewater treatment.

As an improvement, the top surface of the multi-effect treatment device is provided with a plurality of positioning pins, and the top surface of the upper mounting fitting groove of the first, second and third loading heads is provided with positioning grooves in the amount and at a position corresponding to that of the positioning pins. The provision of the positioning pins and the positioning grooves can ensure the assembly precision of the first, second and third loading heads, and is easy to install and simple to use.

According to an aspect of the invention, the apparatus employs an external power source for power supply, wherein the external power source comprises a battery power, an alternating current, and the like.

The operating method of the invention is:

1) The first loading head: the first loading head, the multi-effect treatment device, and the post-treatment device are sequentially assembled from top to bottom;

The petrochemical wastewater is drained to the filter cover, and penetrates into the first loading head with the effect of the gravitational potential energy. The wastewater rotates and falls along with the spiral water guiding piece and flows out through the restriction port to drive the rotating blade to rotate, thereby storing energy for the spring accumulator, during which the central rod is provided at the top with a water pollution detecting sensors for detecting the wastewater to determine the main contents (sulfur, alkali, salt, phenol-containing wastewater), the sulfur, alkali, salt, and phenol containing wastewater sequentially correspond to one, two, three and four of the device, and the sulfur-containing wastewater is taken as an example.

When the main content is determined to be the sulfur-containing wastewater, by controlling the open of the first water control chamber by the controller, the sulfur-containing wastewater enters the first reaction chamber sequentially through the first interface, the first water inlet, and the first water guiding chamber, meanwhile, the controller controls the rotating motor to drive the telescopic motor rod to rotate to the corresponding stirring bevel gear below the first agent storage chamber, and then the two ends of the telescopic motor rod are extended outwardly to engage with the stirring bevel gear and the main bevel gear, and then the main bevel gear is relaxed by the stop motor rod, the rotation by the storage energy generated by the spring accumulator when passing the wastewater drives the stirring bevel gear to rotate, and then drives the stirring rod assembly to rotate, and then the fluid-control collar rotates with the magnetic force between the stirring rod assemblies, the fluid-control collar is further effected by the engagement between the sliding slot and the slider so that it can only move to one end of the circumference, and allowing the treating agent to flow into the stirring rod assembly through the constant interlock between the fluid passing port and the fluid inlets, and then flows into the fluid outlet at the lower portion along the stirring rod assembly, and into the first reaction chamber along the fluid conduit, while it is stirred by the spiral stirring rod to carry out reaction and flocculation, and then passes through the primary filter and the secondary filter to flow into the post-treatment device, and the inflowing wastewater is aerated as the central motor drives the aeration plate to rotate, and then flows into the lower water inlet hole through the annular groove for falling water, and is heated by the heating plate to evaporate, the evaporated water vapor is collected and reused through the steam outlet pipe.

2) The second loading head: the second loading head, the multi-effect treatment device, and the post-treatment device are sequentially assembled from top to bottom;

For treating wastewater with poor fluidity, the petrochemical wastewater is drained to the filter cover, and penetrates into the second loading head with the effect of the gravity potential energy, and the wastewater is continuously stored into the second loading head, during which the pressure of the stored wastewater is monitored by the first water pressure sensor, and the required number of revolutions of the corresponding spring accumulator is calculated by the controller, and the first control motor performs the rotation of the spring accumulator to store energy, and the second water pollution detecting sensor performs the detection to the wastewater to determine its main content (sulphur, alkali, salt, phenol-containing wastewater), the sulfur, alkali, salt, and phenol-containing wastewater sequentially correspond to one, two, three and four of the device, and the sulfur-containing wastewater is taken as an example.

When the main content is determined to be the sulfur-containing wastewater, the subsequent steps are the same as those of the first loading head described above;

3) The third loading head: the third loading head, the multi-effect treatment device, and the post-treatment device are sequentially assembled from top to bottom;

For the treatment of wastewater of known main content, the sulfur-containing wastewater is taken as an example. The sulfur-containing, alkali-containing, salt-containing, and phenol-containing wastewater sequentially correspond to one, two, three and four of the device, and the sulfur-containing wastewater is drained into the first water storage chamber, the second water pressure sensor monitors the water pressure of the first water storage chamber, and the required number of rotations of the corresponding spring accumulator is calculated by the controller, and then the second control motor performs the rotation of the spring accumulator to store energy, Then, the first water control chamber is opened by the controller, and the subsequent steps are the same as those of the first loading head described above.

The controller is Mitsubishi PLC FX1S-30MR-D programmable controller; the device in patent CN202215695U is selected as the spring accumulator and adjusted for the connection part to meet the needs of the present device; the central motor, rotating motor, stop motor rod, telescopic motor rod, heating plates, water pollution detecting sensors, water pressure sensors, and control motors are all commercially available.

The beneficial effects of the invention are:

(1) The invention utilizes the gravity potential energy of the wastewater to carry out water treatment from top to bottom, reduces the use of pump valves, reduces the energy consumption, and at the same time, the devices are combined and spliced, which is easily disassembled and easily cleaned, and the utility is strong.

(2) The invention utilizes the rotating blade to transfer the potential energy of the wastewater to the spring accumulator, and utilizes the built-in mechanism of the multi-effect regulator to release the energy storage of the spring accumulator, and the treating agent corresponding to the circle number of the energy storage is released, the release of the corresponding dosage treating agent can be carried out according to the flow rate of the wastewater, this process does not need power supply, is energy saving and effective, and the amount of the treating agent can be saved.

(3) The first and second water pollution detecting sensors of the present invention detect the water quality of wastewater, and then allow the wastewater to fall into the corresponding reaction chamber, perform the reaction treatment of the corresponding treating agent, improve the wastewater treatment efficiency, and is highly intelligent for classification treatment, has strong automation, easy to use and is effective.

(4) The invention utilizes the cooperation of the fluid-control collar and the stirring rod assembly to realize the effect of fluid discharge in rotary status and fluid blocking in static status, realizes the function by the structure of the device, and has small electromechanical dependence, is energy saving and high efficient, and the use effect is good, the release of the treating agent can be stably controlled.

(5) The invention has designed three different loading heads, which are combined and replaced according to the needs of use, and are simple to use and convenient to clean.

Wherein, 1—multi-effect treatment device, 11a—first water guiding chamber, 11b—second water guiding chamber, 11c—third water guiding chamber, 11d—fourth water guiding chamber, 12a—first water inlet, 12b—second water inlet, 12c—third water inlet, 12d—fourth water inlet, 13a—first reaction chamber, 13b—second reaction chamber, 13c—third reaction chamber, 13d—fourth reaction chamber, 14—central cartridge, 15—partition plate, 16—primary filter, 17—secondary filter, 18—positioning pin, 2—post-treatment device, 21—central motor, 22—aeration plate, 23—air guiding pipe, 24—aeration pump, 25—annular groove for falling water, 26—evaporation device, 261—inlet hole, 262—heating plate, 27—steam outlet pipe, 28—lower mounting fitting groove, 3—first loading head, 31—central rod, 311—first water pollution detecting sensor, 32—spiral water guiding piece, 33—restriction piece, 331—restrictor port, 34—rotating blade, 35a—first water control chamber, 35b—second water control chamber, 35c—third water control chamber, 35d—four water control chamber, 36a—first interface, 36b—second interface, 36c—third interface, 36d—fourth interface, 37—positioning grove, 38—upper mounting fitting groove, 4—multi-effect regulator, 41a—first agent storage chamber, 41b—second agent storage chamber, 41c—third agent storage chamber, 41d—fourth agent storage chamber, 42—spring accumulator, 43—main bevel gear, 44—rotating motor, 441—stop motor rod, 45—telescopic motor rod, 451—left driven bevel gear, 452—right driven bevel gear, 46—connecting rod, 47—stirring bevel gear, 5—stirring rod assembly, 51—fluid outlet, 52—fluid conduit, 53—spiral stirring rod, 54—fluid inlet, 55—first magnetic strip, 6—fluid outlet connecting member, 61—upper fixing plate, 611—upper guiding ring, 62—lower plate, 621—lower guiding ring, 63—fluid—control collar, 631—seal, 632—fluid passing port, 633—second magnetic strip, 64—sliding slot, 65—slider, 7—filter cover, 8—first loading head, 81—first control motor, 82—second water pollution detecting sensor, 83—first water pressure sensor, 9—third loading head, 91—second control motor, 92—second water pressure sensor, 93a—first water storage chamber, 93b—second water storage chamber, 93c—third water storage chamber, 93d—fourth water storage chamber, 94—filter, 10—controller.

DETAILED DESCRIPTION OF THE INVENTION

Structural members, materials and reagents used in the examples are conventionally used in the art or are commercially available unless otherwise indicated.

Example 1

Figure 1:
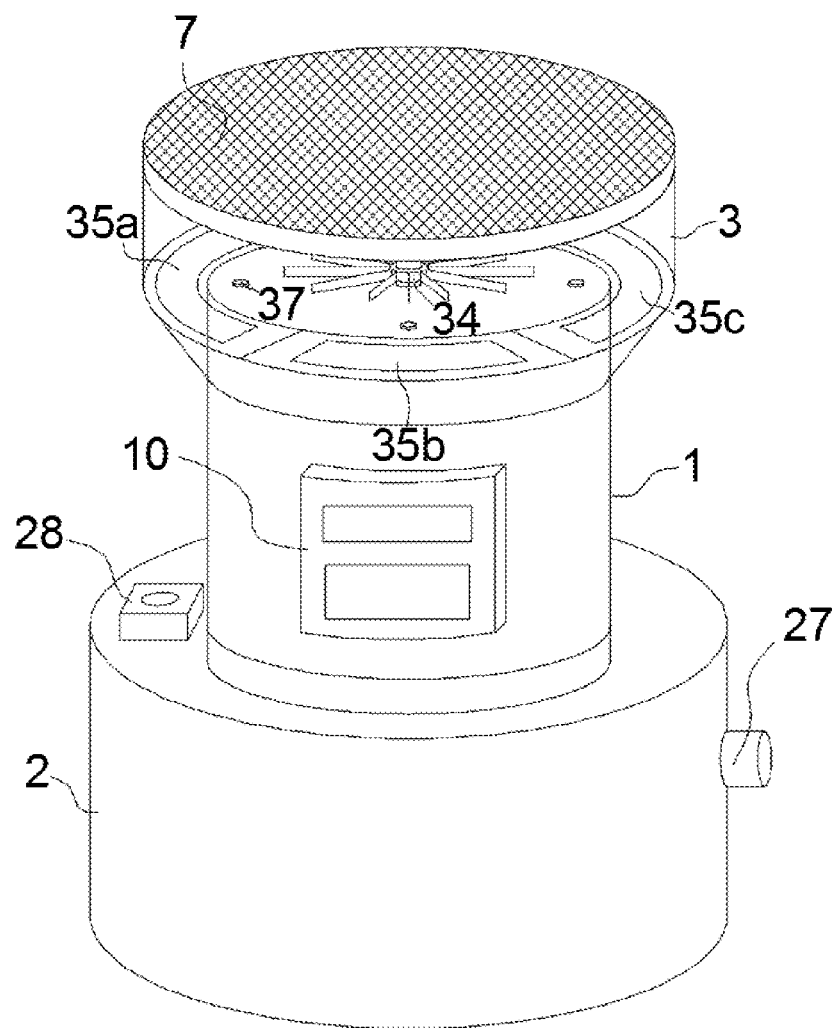
FIG. 1 is an external view of the overall structure of the present invention.
Figure 2:
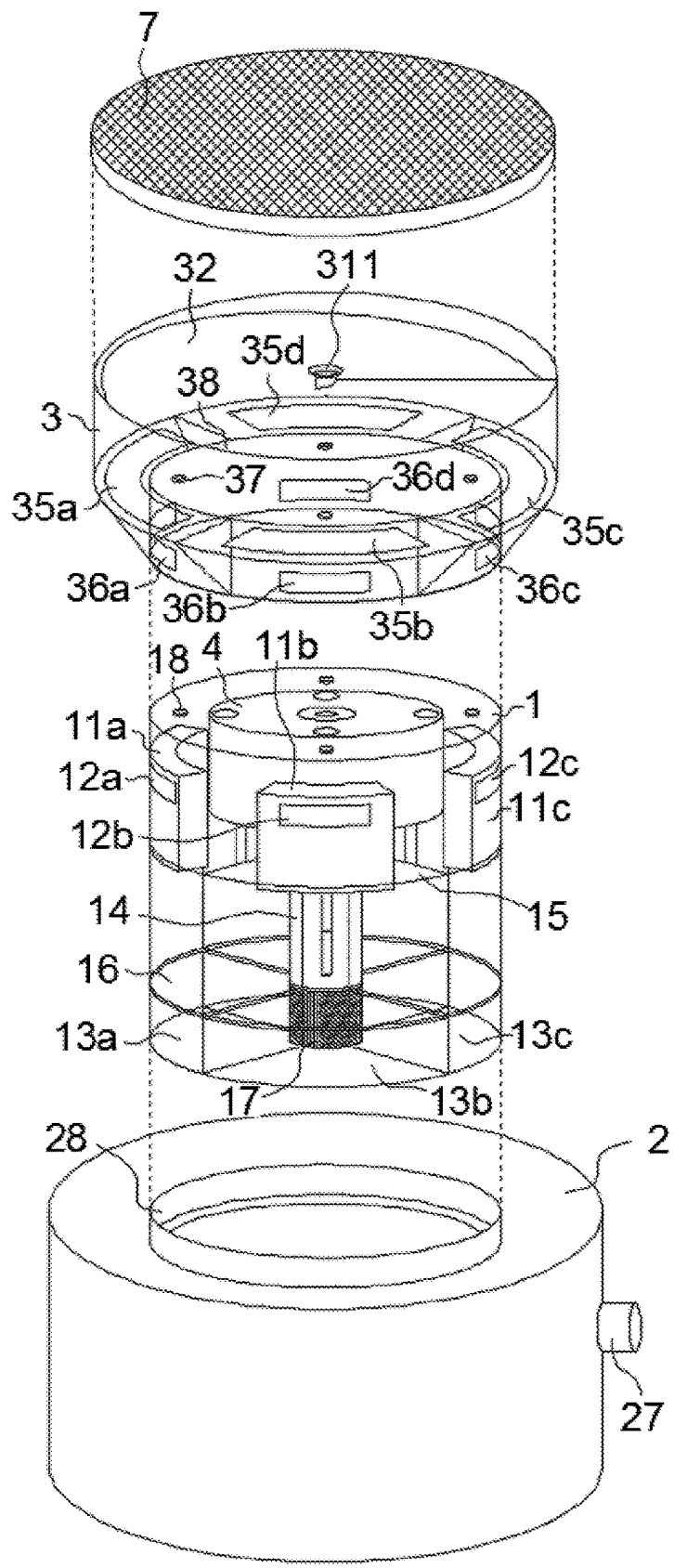
FIG. 2 is a perspective view of the overall structure of the present invention.
Figure 3:
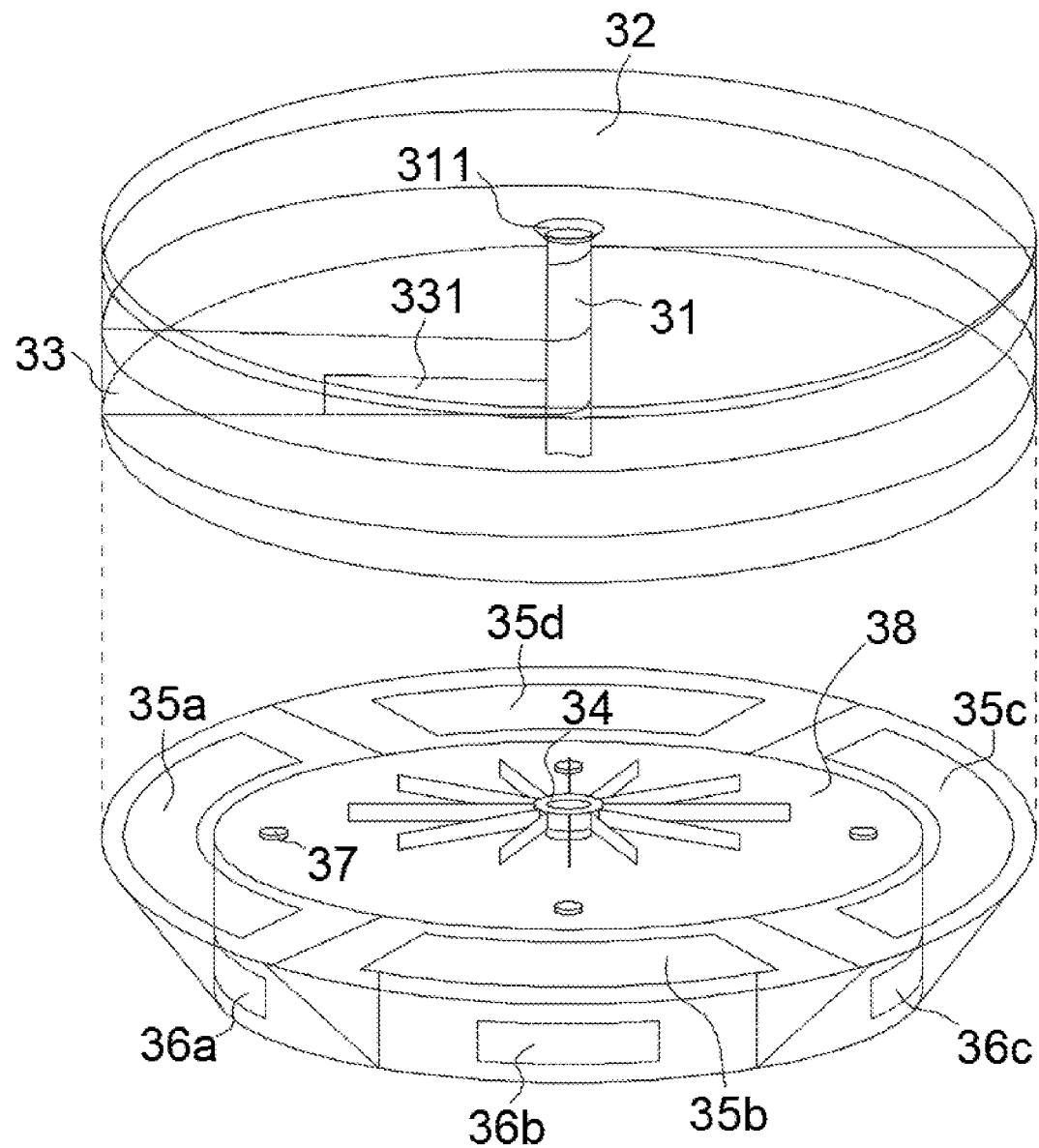
FIG. 3 is an exploded view of the first loading head of the present invention.
Figure 4:
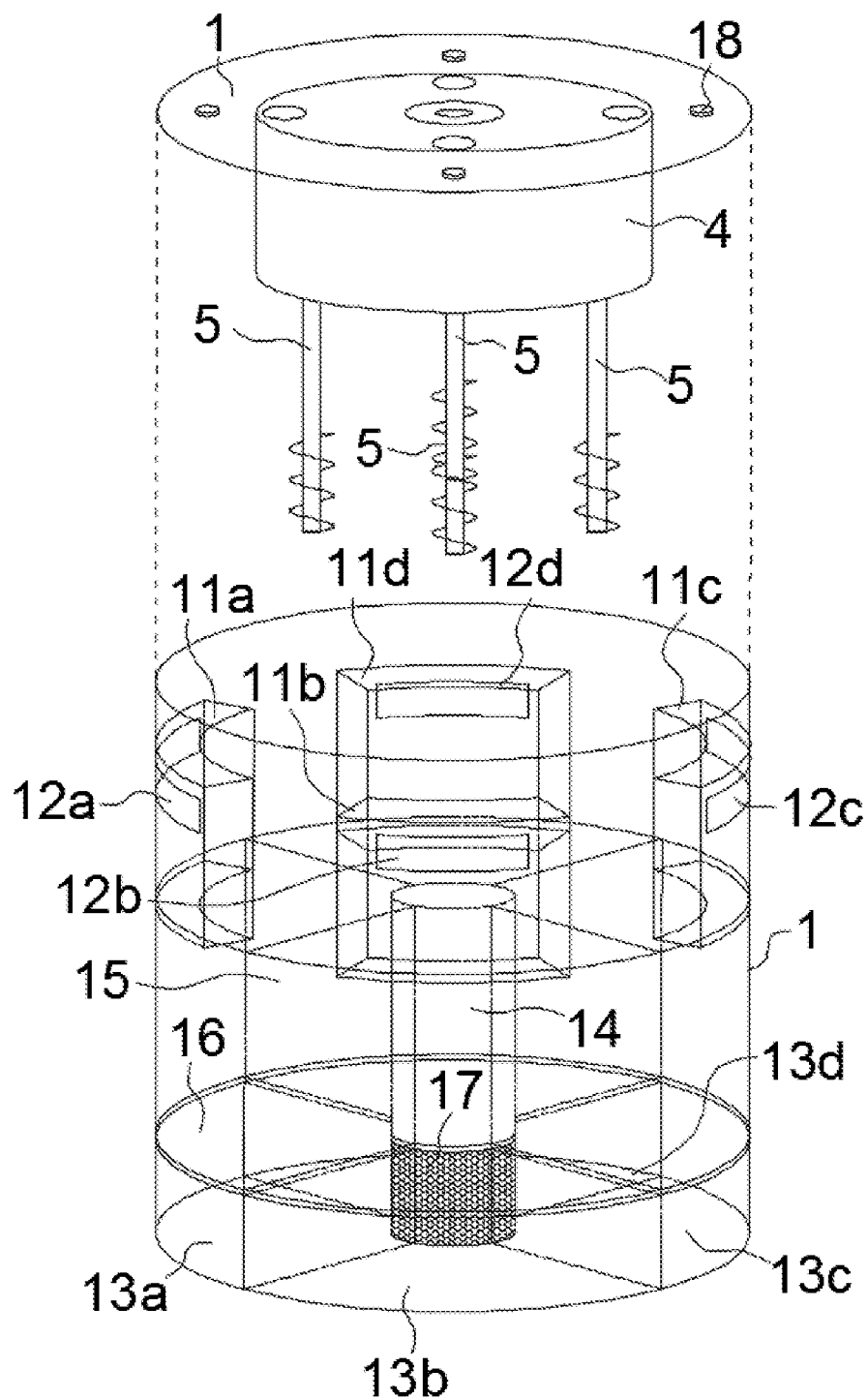
FIG. 4 is a structural schematic view of the multi-effect treatment device of the present invention.
Figure 5:
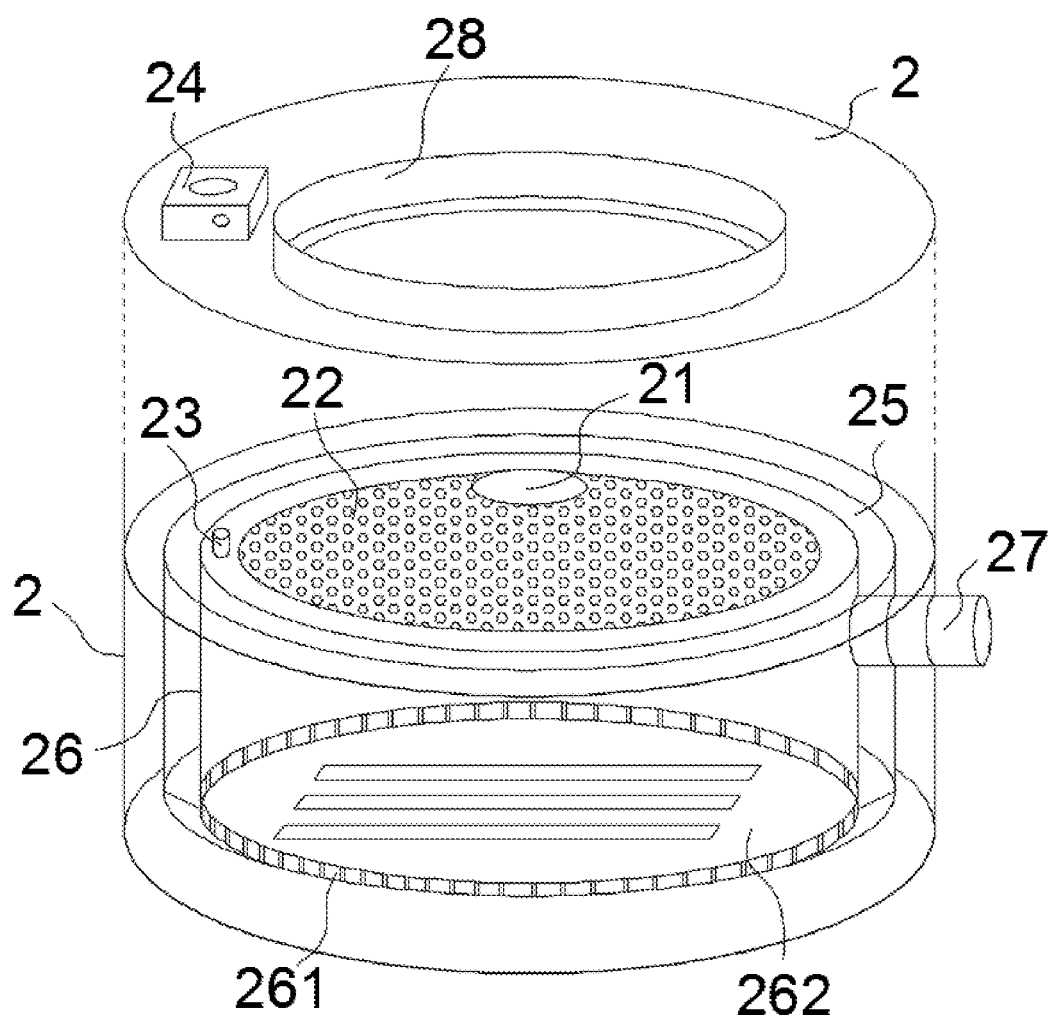
FIG. 5 is a structural schematic view of the post-treatment device of the present invention.

As shown in FIG. 1, the first loading head 3, the multi-effect treatment device 1, and the post-treatment device 2 are sequentially assembled from top to bottom, comprising:

The first loading head 3 for collecting wastewater, storing energy and classifying, as shown in FIG. 2, is provided with an upper mounting fitting groove 38 at the bottom for connecting with the upper end of the multi-effect treatment device 1, as shown in FIG. 3, the center of the first loading head 3 is provided with a central rod 31, and a spiral water guiding piece 32 for collecting wastewater and accelerating the flow of wastewater and a rotating blade 34 for the multi-effect regulator 4 to store energy by rotating with the flow of wastewater are sequentially arranged from top to bottom, a restricting piece 33 for collecting waterflow is provided at the lower outlet of the spiral water guiding piece 32, and a restricting port 331 is provided at a position corresponding to the blade position of the rotating blade 34, and the wastewater is guided and accelerated by the spiral water guiding piece so at to improve the rotation efficiency of the rotating blade, thereby improving the energy storage efficiency of the spring accumulator, saving energy and being effective, and controlling the addition of the treating agent by using the flow potential energy and the flow rate, a first water pollution detecting sensor 311 is disposed at the upper end of the central rod 31 for detecting wastewater and determining the classification of the wastewater, the classification processing is highly intelligent and automatic, and the use is simple and effective, the first loading head 3 is sequentially provided at its circumference with a first, second, third or fourth water control chamber 35*a*, 35*b*, 35*c*, 35*d* for opening the corresponding chamber according to the classification of wastewater, and a first, second, third and fourth interface 36*a*, 36*b*, 36*c*, 36*d* is respectively arranged on the inner side thereof for docking with the corresponding water inlet of the multi-effect treatment device 1, the multi-effect treatment device 1 connected to the lower end of the first loading head 3, as shown in FIGS. 2 and 4, for classifying and processing wastewater, the corresponding positions of the outer upper end of the multi-effect treatment device 1 and the first, second, third, and fourth interfaces 36*a*, 36*b*, 36*c*, and 36*d* are respectively provided with a first, second, third, and fourth water inlets 12*a*, 12*b*, 12*c*, and 12*d*, and a first, second, third, and fourth water guiding chambers 11*a*, 11*b*, 11*c*, 11*d* are correspondingly disposed therein for allowing the corresponding type of wastewater to flow into the corresponding reaction chamber, which falls into the corresponding reaction chamber, and performs reaction treatment of the corresponding treating agent to improve the efficiency of wastewater treatment, a multi-effect regulator 4 located in and above the multi-effect treatment device 1 for releasing the corresponding treating agent according to the type of wastewater, a central cartridge 14 located at the center of the lower portion of the multi-effect treatment device 1, and divides the lower portion of the multi-effect treatment device 1 equally into the first, second, third, and fourth reaction chambers 13*a*, 13*b*, 13*c*, and 13*d* by the partition plate 15, the lower end of the multi-effect treatment device 1 is provided with a primary filter 16 for the primary filtration and purification of the wastewater, a secondary filter 17 is provided on the wall of the central cartridge 14 below the primary filter 16, for the secondary filtration and purification of the wastewater, the arrangement of the secondary filter on the wall of the central cartridge can improve the falling stroke and aeration time of the wastewater, so that the treatment effect is better, the post-treatment device 2 connected to the lower end of the multi-effect treatment device 1, as shown in FIGS. 2 and 5, is provided at the top center with a lower mounting fitting groove 28 for connecting with the lower end of the multi-effect treatment device 1, and an inner central portion of the post-treatment device 2 is provided with an evaporation device 26 for evaporating and purifying the wastewater, and a steam outlet pipe 27 communicating with the outside is provided at the upper right end of the evaporation device 26, and a heating plate 262 for heating is provided on the inner bottom surface of the evaporation device 26, and water inlet holes 261 are uniformly provided at the circumference of the bottom end of the evaporation device 26 to allow the wastewater to circumferentially and uniformly enter the evaporation device to improve the evaporation effect of the evaporation device, an aeration plate 22 is provided in and above the post-treatment device 2, which connects to the outer top surface of the evaporation device 26 by the central motor 21 at the center and rotates, and communicates with the interior of the evaporation device 26 through the annular groove for falling water 25 provided on outer circumference of the aeration plate 22, the annular groove for falling water 25 is provided to effectively utilize the gravity potential energy of the wastewater, so that the wastewater is naturally aerated into the steam treatment stage after aeration treatment, which is energy saving and effective, and an aeration pump 24 is disposed on the left side of the top surface of the post-treatment device 2 for communicating with the aeration plate 22 through the air guiding pipe 23 located on the left side of the aeration plate 22, the aeration plate is a truncated cone type, is rotated and aerated by the center motor, which can improve the aeration effect of the wastewater and improve the treatment effect of the wastewater, the controller 10, which is connected to the front side of the multi-effect treatment device 1, shown in FIG. 1 for data connection with each component in the apparatus.

Figure 6:
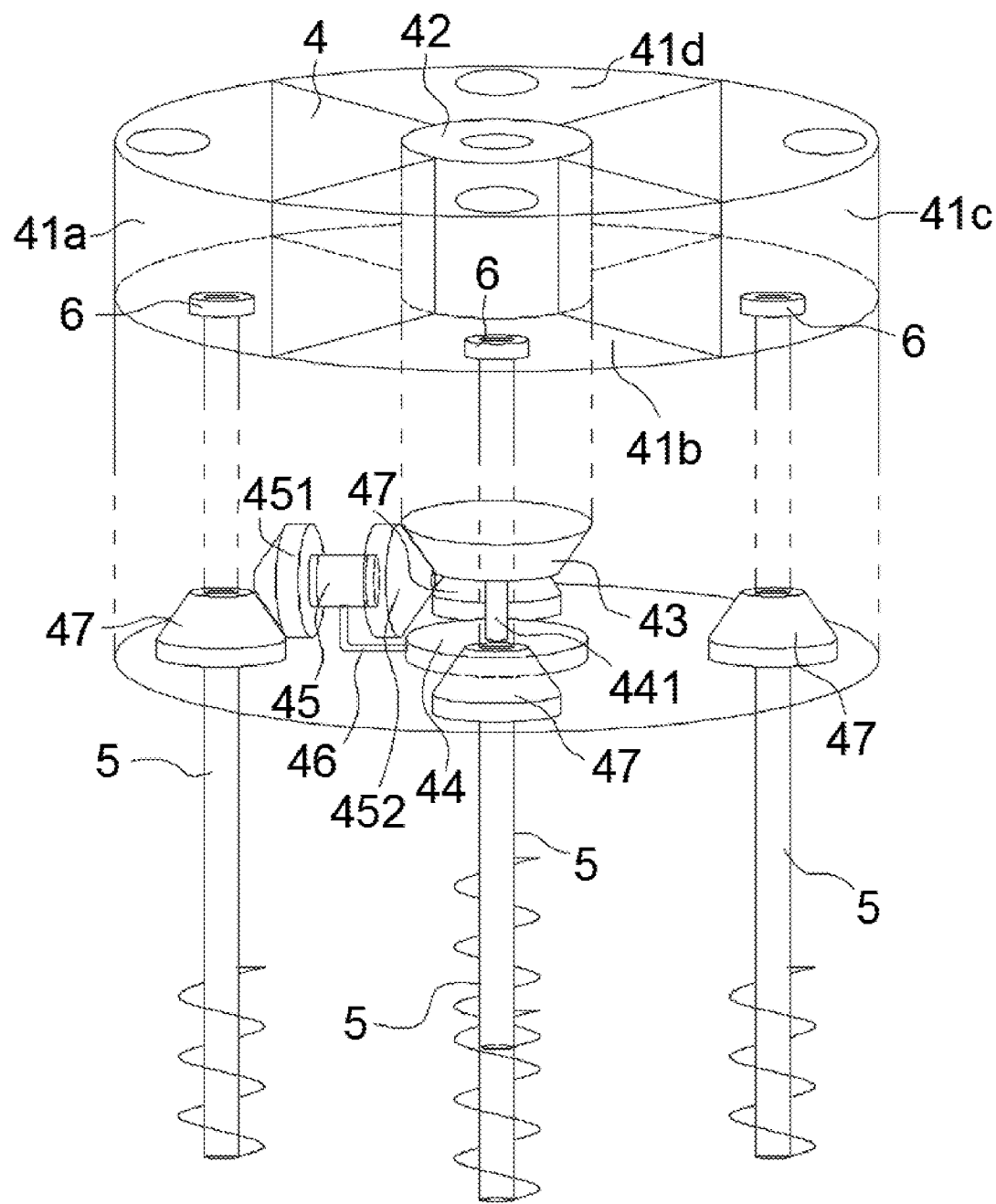
FIG. 6 is an exploded view of the multi-effect regulator of the present invention.
Figure 7:
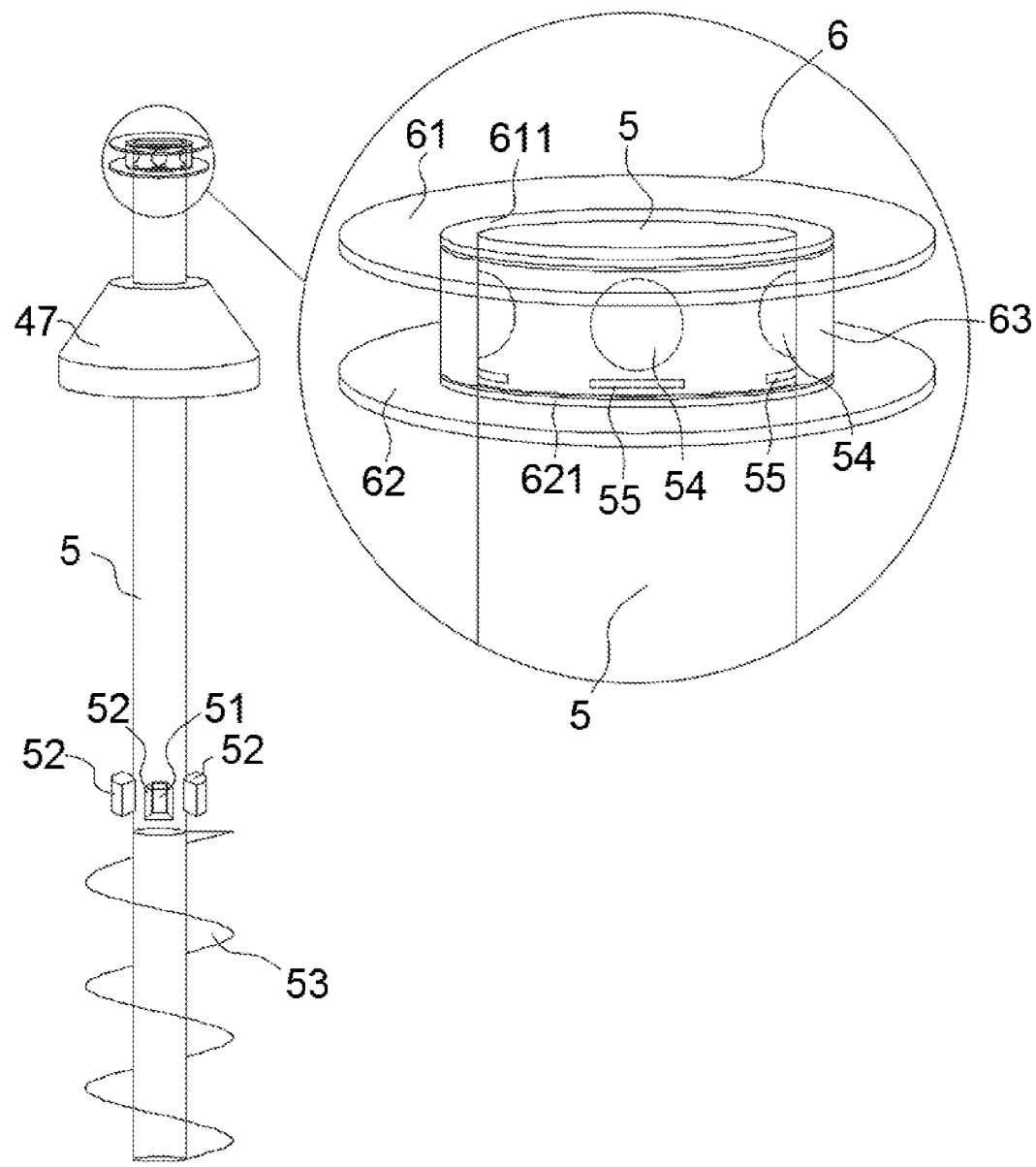
FIG. 7 is a structural schematic view of the stirring rod assembly of the present invention.

As shown in FIG. 6, a spring accumulator 42 is provided in the upper center of the multi-effect regulator 4 for storing the kinetic energy from the rotation of the rotating blade 34, and the space between the spring accumulator 42 and the inner wall of the multi-effect regulator 4 is divided equally into first, second, third and fourth agent storage chambers 41*a*, 41*b*, 41*c*, 41*d*. The water potential energy is stored by using the spring accumulator 42, which is simple and effective, economical, energy-saving and environmentally friendly, and easy to promote and use, four stirring bevel gears 47 respectively corresponding to the positions of the first, second, third and fourth agent storage chambers 41*a*, 41*b*, 41*c*, 41*d* are arranged on the bottom surface of the multi-effect regulator 4 for driving the stirring rod assembly 5 to rotate, the upper ends of each of the stirring rod assemblies 5 are respectively connected to the first, second, third and fourth agent storage chambers 41*a*, 41*b*, 41*c*, 41*d* by a fluid outlet connecting member 6 disposed on the bottom surfaces thereof, as shown in FIG. 7, the stirring rod assembly 5 is hollow inside, and a spiral stirring rod 53 is fixedly connected to the lower end thereof, the energy storage of the spring accumulator is released by a built-in mechanism of the multi-effect regulator, such that the stirring bevel gear is rotated, and the reaction chamber is stirred and the treating agent is added, this process does not require power supply, is energy saving and effective, a fluid outlet 51 for releasing the treating agent is provided on the surface of the stirring rod assembly 5 above the spiral stirring rod 53, and a fluid conduit 52 for guiding is provided outside the stirring rod assembly 5, as shown in FIG. 6, the spring accumulator 42 is connected by its upper input shaft with the rotating blade 34, and is provided at the lower bottom surface with a main bevel gear 43, a rotating motor 44 for rotation is provided at the center of the inner bottom surface of the multi-effect regulator 4 located below the spring accumulator 42, and the left side of the rotating motor 44 is connected with the telescopic motor rod 45 disposed between the main bevel gear 43 and the stirring bevel gear 47 by the connecting rod 46, and the left end of the telescopic motor rod 45 is transmitted to the stirring bevel gear 47 by the left driven bevel gear 451 and the right end of the telescopic motor rod 45 is transmitted to the main bevel gear 43 by the right driven bevel gear 452, the telescopic motor rod 45 is used for controlling the occlusion transmission, and by using the transmission between the main bevel gear, the telescopic motor rod, the left driven bevel gear and the right transmission bevel gear, the energy storage is released from the spring accumulator and the treating agent corresponding to the number of revolutions of the energy storage is released, and the release of the corresponding dosage of the treating agent can be performed according to the flow rate of wastewater. This process does not require power supply, is energy-saving and effective, and can save the addition of the treating agent, and a stop motor rod 441 is provided at the top surface of the rotating motor 44 to stop the main bevel gear 43 so as to store energy by the spring accumulator 42, which can effectively prevent the invalid release of the energy storage from the spring accumulator, thus influencing the efficiency and effectiveness of the wastewater treatment control.

Figure 8:
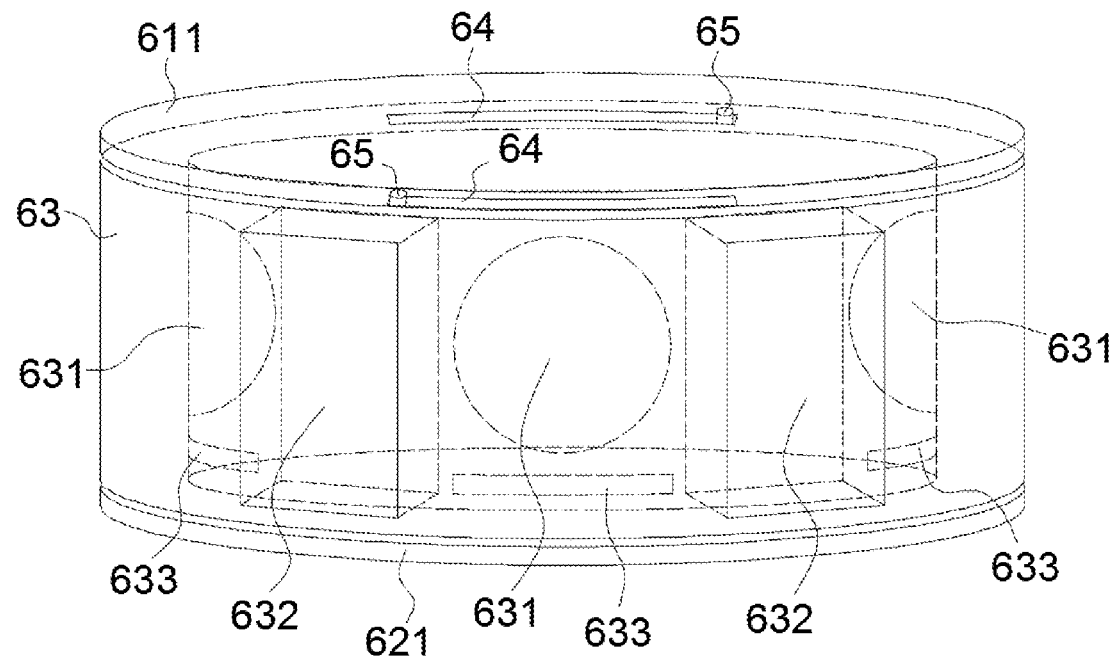
FIG. 8 is a structural schematic view of the fluid-control collar of the present invention.

As shown in FIG. 7, the fluid outlet connecting member 6 comprises an upper fixing plate 61, a lower fixing plate 62 and a fluid-control collar 63. The upper fixing plate 61 is fixedly connected to the top surface of the stirring rod assembly 5, and the lower fixing plate 62 is fixed to the bottom surface of the agent storage chamber, and its inner side surface is respectively provided with an upper guiding ring 611 and a lower guiding ring 621. The fluid-control collar 63 is located between the upper guiding ring 611 and the lower guiding ring 621 for controlling the release of the treating agent. A plurality of fluid inlets 54 are evenly distributed on the upper outer peripheral wall of the stirring rod assembly 5 for flowing the treating agent into the stirring rod assembly 5 through the fluid inlets 54, and a first magnetic strip 55 fitting for the fluid-control collar 63 is disposed below the fluid inlets 54, as shown in FIG. 8, the inner side surface of the fluid-control collar 63 is provided with a sealing piece 631 and a second magnetic strip 633 corresponding to the position of the fluid inlets 54 and the first magnetic strip 55, the fluid-control collar 63 may be restore to a fluid blocking status in a normal state by the magnetic force cooperation between the first magnetic strip 55 and the second magnetic strip 633, the structure is simple and effective, and the use effect is good, neodymium iron boron magnet is selected for the first magnetic strip 55 and the second magnetic strip 633, a fluid passing port 632 is provided between each two seals 631 for docking with the fluid inlets 54 to flow the treating agent into the stirring rod assembly 5, the top surface and the lower bottom surface of the fluid-control collar 63 are respectively provided with a sliding slot 64, the sliding slot 64 is matched with the slider 65 provided at the corresponding position of the upper guiding ring 611 and the lower guiding ring 621 for docking with the fluid passing port 632 and the fluid inlets 54 by the stopping point that allowing the rotation of the fluid-control collar, such that an effect of fluid discharge in rotary status and fluid blocking in static status is realized by the cooperation of the fluid-control collar 63 with the upper guiding ring 611 and the lower guiding ring 621. By the structure of the apparatus, the electromechanical dependence is small, and is energy saving and effective, the use effect is good, and the release control of the treating agent is stable.

As shown in FIG. 2, a filter cover 7 is provided at the upper end of the first loading head 3 for filtering large particulate impurities in the wastewater. The filter cover 7 is provided to effectively prevent large particle impurities from being congested in subsequent steps and improve the effect of wastewater treatment. As shown in FIG. 3 and FIG. 4, the top surface of the multi-effect treatment device 1 is provided with a plurality of positioning pins 18, and the top surface of the upper mounting fitting groove 38 of the first loading head 3 is provided with positioning grooves 37 corresponding to the amount and position of the positioning pins 18. The provision of the positioning pin 18 and the positioning groove 37 can ensure the assembly precision of the first loading head 3, and the installation is simple and easy to use.

The method for treating wastewater using the above device is:

The petrochemical wastewater is drained to the filter cover 7, and penetrates into the first loading head 3 as the gravitational potential energy flows. The wastewater rotates downwards and along with the spiral water guiding piece 32, and flows out through the restriction port 331 to push the rotating blade 34 to rotate such that energy is stored by the spring accumulator 42, and the first water pollution detecting sensor 311 is disposed at the top end of the central rod 31 to detect the wastewater, and determined the same to be a sulfur-containing, alkali-containing, salt-containing or phenol-containing wastewater, ad the sulfur-containing, alkali-containing, salt-containing or phenol-containing wastewater correspond to the first, second, third and fourth parts of the device, respectively, and the sulfur-containing wastewater is taken as an example for description.

When the main content is determined to be the sulfur-containing wastewater, by controlling the open of the first water control chamber 35*a* by the controller 10, the sulfur-containing wastewater enters the first reaction chamber 13*a* sequentially through the first interface 36*a*, the first water inlet 12*a*, and the first water guiding chamber 11*a*, meanwhile, the controller 10 controls the rotating motor 44 to drive the telescopic motor rod 45 to rotate to the corresponding stirring bevel gear 47 below the first agent storage chamber 41*a*, and then the two ends of the telescopic motor rod 45 are extended outwardly to engage the left driven bevel gear 451, the right driven bevel gear 452 with the corresponding stirring bevel gear 47 and main bevel gear 43, and then the main bevel gear 43 is relaxed by the stop motor rod 441, the rotation with the storage energy generated by the spring accumulator 42 when passing the wastewater drives the stirring bevel gear 47 to rotate, and then drives the stirring rod assembly 5 to rotate, and then the fluid-control collar 63 rotates with the magnetic force between the stirring rod assemblies 5, the fluid-control collar 63 is further effected by the engagement between the sliding slot 64 and the slider 65 so that it can only move to one end of the circumference, and realizing the flow of the treating agent into the stirring rod assembly 5 through the constant interlock between the fluid passing port 632 and the fluid inlets 54, and then into the fluid outlet 54 at the lower portion along the stirring rod assembly 5, and into the first reaction chamber 13 along the fluid conduit 52, while with the stirring effect by the spiral stirring rod 53 to carry out reaction and flocculation, it passes through the primary filter 16 and the secondary filter 17 to flow into the post-treatment device 2, and the inflowing wastewater is aerated as the central motor 14 drives the aeration plate 22 to rotate, and then flows into the lower water inlet hole 261 through the annular groove for falling water 25, and is heated by the heating plate 262 to evaporate, the evaporated water vapor is collected and reused through the steam outlet pipe 27. An external power supply is used in the present apparatus to supply power to the apparatus, wherein the external power supply is a lithium battery supply.

The controller 10 is a Mitsubishi PLC FX1S-30MR-D programmable controller; the spring accumulator 42 is selected from the device in patent CN202215695U, with the connecting portion adjusted to be detachably connected with the rotating blade 34 by changing the top of the upper end into a fitting of cross-shaped groove, the lower end is connected and fixed to the stirring bevel gear 47; the central motor 14, the rotating motor 44, the stop motor rod 441, the telescopic motor rod 45, the heating plate 262, the first and second water pollution detecting sensors 311, 82, the first and second water pressure sensors 83, 92, and the first and second control motors 81, 91 are all commercially available.

Example 2

Figure 9:
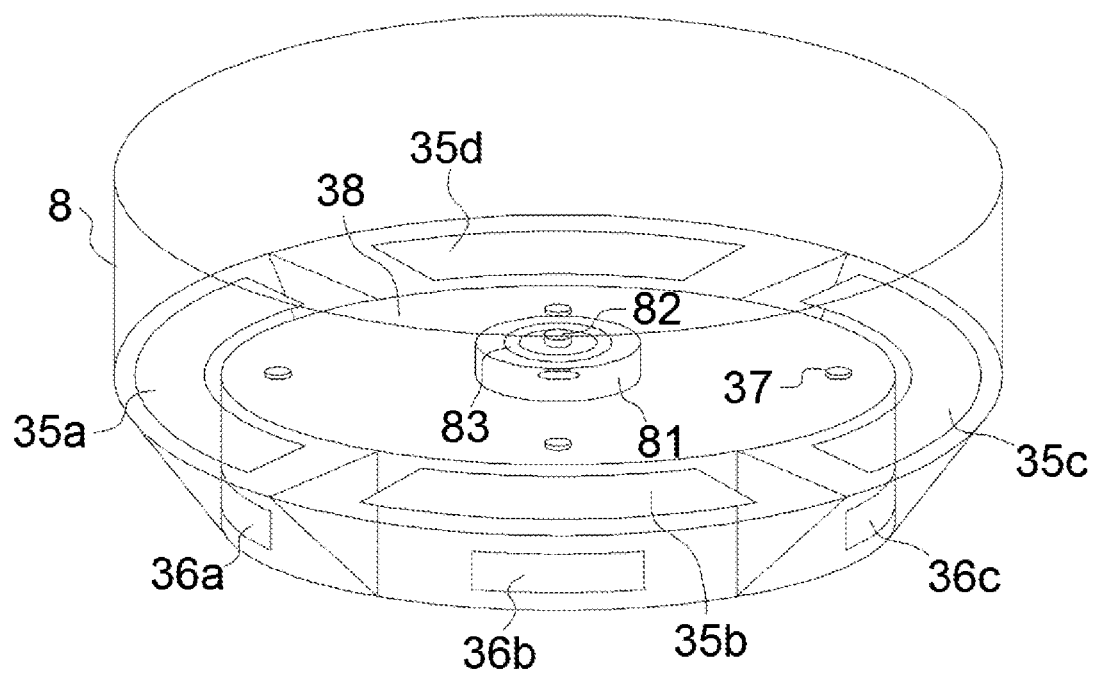
FIG. 9 is a structural schematic view of the second loading head of the present invention.
Figure 11:
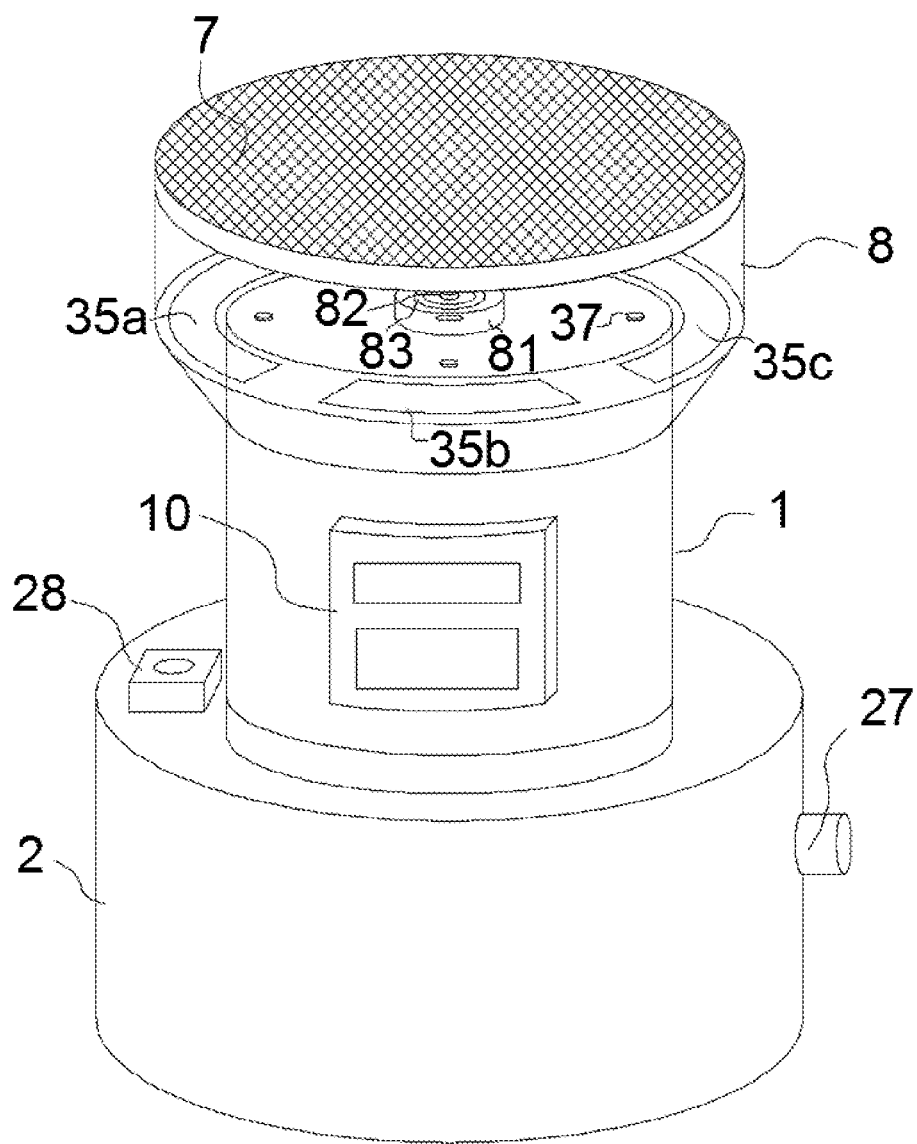
FIG. 11 is a perspective view of the overall structure of a combination of Embodiment 2 of the present invention.

As shown in FIG. 11, the second loading head 8, the multi-effect treatment device 1, and the post-treatment device 2 are sequentially assembled from top to bottom;

The difference from Example 1 is that, as shown in FIG. 9, the first loading head 3 at the upper end of the multi-effect treatment device 1 can also be replaced with the second loading head 8, and the center of the bottom surface of the second loading head 8 is provided with a first control motor 81, a second water pollution detecting sensor 82 is provided at the center of the top surface of the first control motor 81, and a first water pressure sensor 83 for detecting the water storage pressure is disposed outside the circumference of the second water pollution detecting sensor 82. The first control motor 81 is configured to perform control of energy storage amount of the spring accumulator 42 according to the collected data, and the second loading head 8 is sequentially provided at its circumference with first, second, third and fourth water control chambers 35a, 35b, 35c, 35d for opening the corresponding chamber according to the wastewater classification, and with the first, second, third and fourth interface 36a, 36b, 36c, 36d on the inner side for docking with the corresponding water inlets of the multi-effect treatment device 1. The second loading head 8 is used for the poor flowability of the wastewater, the reaction error of the multi-effect treatment device 1 is reduced by the pre-storage and then the treatment, so that the wastewater of poor flowability can be efficiently treated by the present device.

As shown in FIG. 11, a filter cover 7 is provided at the upper end of the second loading head 8 for filtering large particulate impurities in the wastewater. The filter cover 7 is provided to effectively prevent large particle impurities from being congested in subsequent steps and improve the wastewater treatment effect. As shown in FIG. 9, the top surface of the upper mounting fitting groove 38 of the second loading head 8 is provided with positioning grooves 37 corresponding to the amount and position of the positioning pins 18. The provision of the positioning pin 18 and the positioning groove 37 can ensure the assembly precision of the second loading head 3, and the installation is simple and easy to use.

The method for treating wastewater using the above device is:

For treating wastewater with poor fluidity, the petrochemical wastewater is drained to the filter cover 7, and penetrates into the second loading head 8 with the gravity potential energy, and the wastewater is continuously stored into the second loading head 8, during which the water pressure of the stored wastewater is monitored by the first water pressure sensor 83, and the required number of revolutions of the corresponding spring accumulator 42 is calculated by the controller 10, and then the energy storage at rotation of the spring accumulator 42 is performed by the first control motor 81, the wastewater is detected by the second water pollution detecting sensor 82 and is determined as a sulfur-containing, alkali-containing, salt-containing or phenol-containing wastewater, and the sulfur-containing, alkali-containing, salt-containing, and phenol-containing wastewater sequentially corresponds to one, two, three, four of the device, the case of sulfur-containing wastewater is taken as an example.

When the main content is determined to be the sulfur-containing wastewater, the subsequent steps are the same as those in the first example. This apparatus uses an external power supply to supply power to the apparatus, wherein the external power supply is an alternating current.

Example 3

Figure 10:
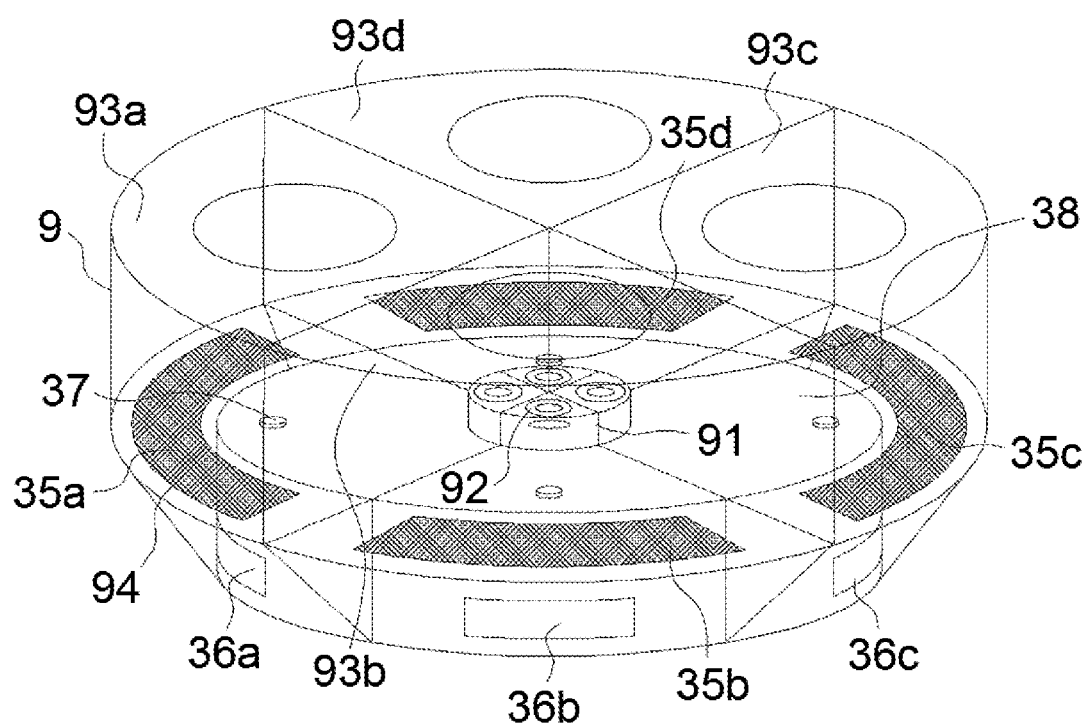
FIG. 10 is a structural schematic view of the third loading head of the present invention.
Figure 12:
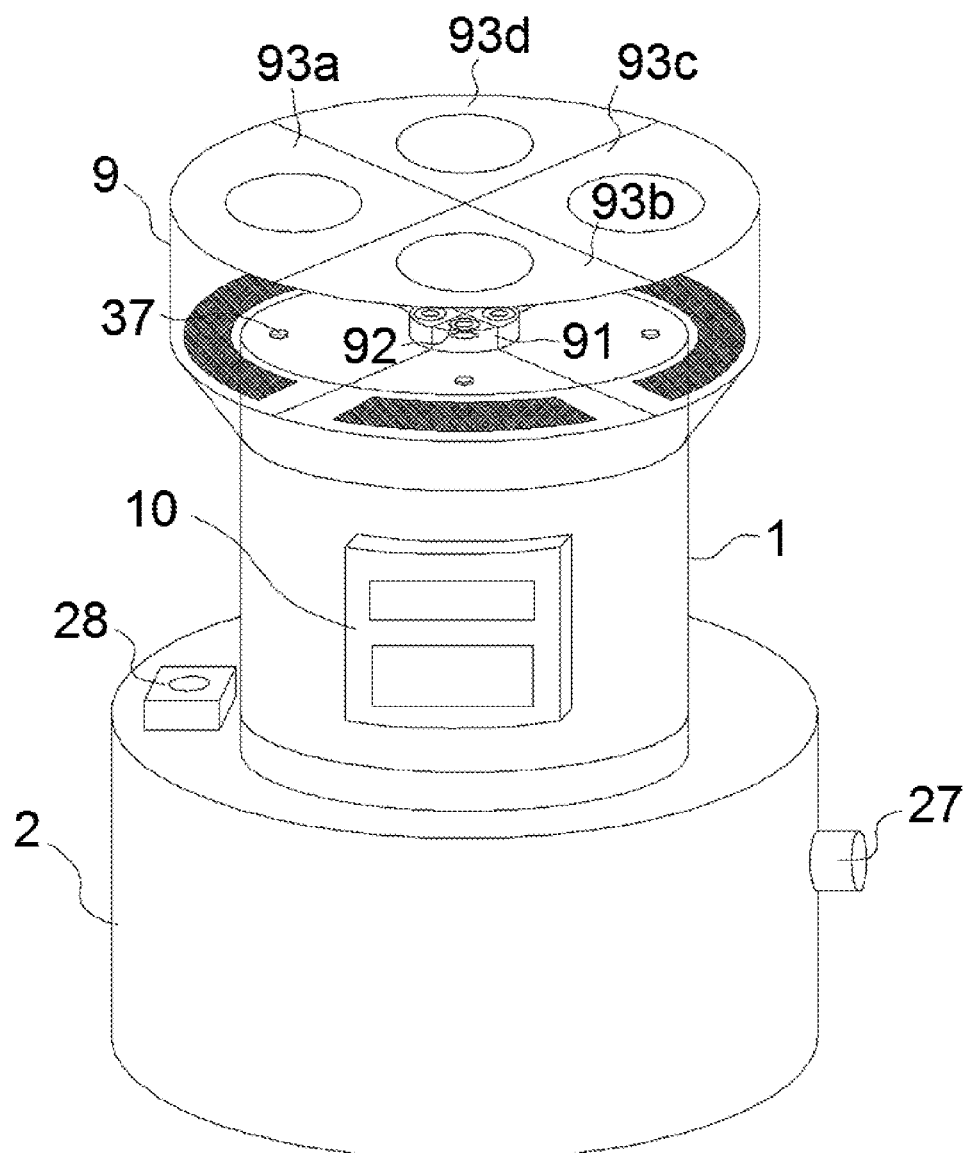
FIG. 12 is a perspective view of the overall structure of a combination of Embodiment 3 of the present invention.

As shown in FIG. 12, the third loading head 9, the multi-effect treatment device 1, and the post-treatment device 2 are sequentially assembled from top to bottom;

The difference from example 1 is that, as shown in FIG. 10, the first loading head 3 at the upper end of the multi-effect treatment device 1 can also be replaced with a third loading head 9, and the center of the bottom surface of the second loading head 9 is provided with a second control motor 91 configured to perform control of energy storage amount of the spring accumulator 42 according to the collected data. The third loading head 9 is sequentially provided at its circumference with first, second, third and fourth water control chambers 35a, 35b, 35c, 35d for opening the corresponding chamber according to the classification of the wastewater, and with the first, second, third and fourth interface 36a, 36b, 36c, 36d respectively on the inner side for docking with the corresponding water inlet of the multi-effect treatment device 1, the space inside the third loading head 9 is divided into first, second, third and fourth water storage chamber 93a, 93b, 93c, 93d according to the corresponding positions of the first, second, third and fourth water control chambers 35a, 35b, 35c, 35d, and the contact faces of the second control motor 91 and the first, second, third and fourth water storage chambers 93a, 93b, 93c, 93d are each provided with a second water pressure sensor 92 for detecting the water storage pressure, and the first, second, third and fourth water control chambers 35a, 35b, 35c and 35d are provided with a filters 94 for filtering large particle impurities in the wastewater. The third loading head 9 is used for the known main content of the wastewater, and the discharge of the corresponding storage chamber is performed, the water pollution detecting portion is saved, the processing steps and the calculation amount of the controller 10 are simplified, is energy saving and effective, and the known wastewater can be efficiently processed. At the same time, the first control motor 81 and the second control motor 91 perform the torsion storage rotation of the corresponding dosage by the monitoring result of the water pressure sensor, and the dosage of the treating agent can be controlled.

As shown in FIG. 10, the top surface of the upper mounting fitting groove 38 of the third loading head 9 is provided with positioning grooves 37 corresponding to the amount and position of the positioning pins 18. The provision of the positioning pin 18 and the positioning groove 37 can ensure the assembly precision of the third loading head 9, and the installation is simple and easy to use.

The method for treating wastewater using the above device is:

For the treatment of known main content wastewater, the sulfur-containing wastewater is taken as an example. The sulfur-containing, alkali-containing, salt-containing, and phenol-containing wastewater sequentially corresponds to one, two, three and four of the device, and the sulfur-containing wastewater is drained to the first water storage chamber 93a, the water pressure of the first water storage chamber 93a is monitored by the second water pressure sensor 92, and the required number of rotations of the corresponding spring accumulator 42 is calculated by the controller 10, and then the energy storage at rotation of the spring accumulator 42 is performed by the second control motor 91, Then, the first water control chamber 35a is started by the control of the controller 10, and the subsequent steps are the same as those in the example 1. This apparatus uses an external power supply to supply power to the apparatus, wherein the external power supply is an alternating current.

Petrochemical Wastewater Treatment Test (1) Test Grouping

The test was divided into 6 groups, 3 experimental groups and 3 control groups, 3 experimental groups were treated with Examples 1-3 of the present invention, and 3 control groups were treated with the device in patent CN107827294A.

(2) Test Conditions

In the first, second, third and fourth agent storage chambers 41a, 41b, 41c, 41d in the experimental group 1-3, a sulfur, alkali, salt, and phenol-containing wastewater treating agent is added respectively, and the experimental group 1, 2, and 3 are grouped with the control group 1, 2, and 3 respectively, in the experimental group 1 and control group 1, experimental group 2 and control group 2, 1 L sulfur, alkali, salt, and phenol-containing wastewater were sequentially introduced, the interval between each wastewater is 20 min; in the experimental group 3 and the control group 3, the sulfur-containing wastewater is introduced; at the same time, in order to ensure the comparability of the treatment effect, the activated carbon in the patent CN107827294A device is removed and a sulfur-containing, alkali-containing, salt-containing, phenol-containing wastewater treating agent are manually added.

(3) Test Equipment

Water pump, water quality monitor, PY-G8 mobile meter, computer.

(4) Test Methods

Experimental group 1 and control group 1 were sequentially introduced with 1 L of sulfur-containing, alkali-containing, salt-containing, and phenol-containing wastewater at intervals of 20 min;

Experimental group 2 and control group 2 were sequentially introduced with 1 L of sulfur-containing, alkali-containing, salt-containing, and phenol-containing wastewater every 20 min;

Experimental group 3 and the control group 3 were introduced with 1 L of sulfur-containing wastewater; the results of the treatment were obtained by comparison.

(5) Test Results

The corresponding treating agent in experimental groups 1, 2, and 3 do not need manual addition, which is more convenient to use and reduces the workload of the staff;

In the experimental group 1, after comparison with the control group 1, the treatment efficiency of the sulfur-containing wastewater was increased by 23%, the treatment efficiency of the alkali-containing wastewater was increased by 22%, the treatment efficiency of the salt-containing wastewater was increased by 24%, and the treatment efficiency of the phenol-containing wastewater was increased by 20%, wherein the use of sulfur, alkali, salt, and phenol-containing wastewater treating agent is reduced by an average of 11%, and the average utilization rate of sulfur, alkali, salt, and phenol-containing wastewater treating agent is 98.3%, the total energy consumption during the treatment by the apparatus is reduced by 31%;

In the experimental group 2, compared with the control group 2, the treatment efficiency of the sulfur-containing wastewater was increased by 24%, the treatment efficiency of the alkali-containing wastewater was increased by 24%, the treatment efficiency of the salt-containing wastewater was increased by 25%, and the treatment efficiency of the phenol-containing wastewater was increased by 21%, wherein the amount of sulfur, alkali, salt, and phenol-containing wastewater treating agent is reduced by an average of 13.5%, and the average utilization rate of sulfur, alkali, salt, and phenol-containing wastewater treating agent is 99.2%, the total energy consumption during the treatment by the apparatus is reduced by 27%;

In the experimental group 3, as compared with the control group 3, the treatment efficiency of the sulfur-containing wastewater was increased by 24%, the utilization rate of the sulfur-containing wastewater treating agent was decreased by 13.1%, and the utilization rate of the sulfur-containing wastewater treating agent was 99.1%, the total energy consumption during the treatment by the apparatus is reduced by 25%.

It can be seen from the results of the experimental group 1 and the control group 1, the experimental group 2 and the control group 2 that the invention has remarkable effects in treating multiple groups of petrochemical wastewater, has low energy consumption, is energy-saving and environmentally friendly, and has excellent treatment effect, at the same time, as compared with the manual addition of the treating agent, the present has good control effect and high utilization efficiency of the treating agent, that is, the optimal dosage of the treating agent in the treatment process of the present invention can achieve excellent treatment effect, and various petrochemical wastewaters can be efficiently and quickly treated;

It can be seen from the results of the experimental group 3 and the control group 3 that in terms of manual addition of the treating agent in the present invention, and the control effect is good and the utilization efficiency of the treating agent is high, that is, the optimal dosage of the treating agent in the treatment process of the present invention can achieve excellent treatment effect.

We claim:

1. A multi-effect energy-saving apparatus for pollution control and utilization of petrochemical water, comprising:

a first loading head (3) for collecting wastewater, storing energy and classifying and is provided at a bottom with an upper mounting fitting groove (38) for connecting with an upper end of a multi-effect treatment device (1), the first loading head (3) is provided at a center with a central rod (31), which is sequentially provided from top to bottom with a spiral water guiding piece (32) for collecting wastewater and accelerating a flow of the wastewater and a rotating blade (34) for rotating with a flow force of the wastewater for a multi-effect regulator (4) to store energy, a lower outlet of the spiral water guiding piece (32) is provided with a restricting piece (33) for collecting the flow, a restricting port (331) is provided on the restricting piece (33) at the position corresponding to the rotating blade (34), a first water pollution detecting sensor (311) is provided at an upper end of the central rod (31) for detecting wastewater and determining the classification of the wastewater, the first loading head (3) is sequentially provided at its circumference with a first, second, third, and fourth water control chamber (35a, 35b, 35c, 35d) for opening the corresponding chamber according to the classification of the wastewater, and with a first, second, third and fourth interface (36a, 36b, 36c, 36d) at inner side for docking with corresponding inlets of the multi-effect treatment device (1), the multi-effect treatment device (1) is configured to connecting to a lower end of the first loading head (3) for classifying and treating the wastewater, and is arranged at the positions of an outer upper end corresponding to the first, second, third and fourth interface (36a, 36b, 36c, 36d) with a first, second and third and fourth inlet (12a, 12b, 12c, 12d) respectively, and is correspondingly provided inside with a first, second, third and fourth water guiding chamber (11a, 11b, 11c, 11d) for the corresponding type of wastewater to flow into corresponding reaction chamber, a multi-effect regulator (4) located in and above the multi-effect treatment device (1) for releasing a corresponding treating agent according to the type of wastewater, a central cartridge (14) located in a lower center of the multi-effect treatment device (1) and divides a lower portion of the multi-effect treatment device (1) equally into a first, second, third and fourth reaction chamber (13a, 13b, 13c, 13d) through partition plates (15), and a lower end of the multi-effect treatment device (1) is respectively provided with a primary filter (16) for primary filtrating and purifying the wastewater, a wall of a central cartridge (14) below the primary filter (16) is respectively provided with secondary filters (17) for secondary filtrating and purifying the wastewater, a post-treatment device (2) connected to a lower end of the multi-effect treatment device (1), and is provided at a top center with a lower mounting fitting groove (28) for connecting with the lower end of the multi-effect treatment device (1), the post-treatment device (2) is provided at a center with an evaporation device (26) for evaporating and purifying the wastewater, and at an upper right end with a steam outlet pipe (27) for communicating with outside, a heating plate (262) is provided at a bottom surface of the evaporation device (26) for heating, and water inlet holes (261) are uniformly arranged at the circumference of a lower bottom of the evaporation device (26), the post-treatment device (2) is provided on an upper portion with an aeration plate (22) configured to connecting to and rotating with an upper top surface of the evaporation device (26) by a central motor (21) at the center, and communicating with an interior of the evaporation device (26) through an annular groove for falling water (26) provided at outer circumference of the aeration plate (22), the post-treatment device (2) is provided on a left side of a top surface with an aeration pump (24) for communicating with the aeration plate (22) by an air guiding pipe (23) at a left side of the aeration plate (22), a controller (10) connecting to a front side of the multi-effect treatment device (1) for data connection with various components in the apparatus and for collecting data.

2. The apparatus according to claim 1, wherein the multi-effect regulator (4) is provided at the upper center with a spring accumulator (42) for storing a kinetic energy from the rotation of the rotating blade (34), and a space between the spring accumulator (42) and an inner wall of the multi-effect regulator (4) is divided equally into a first, second, third and fourth agent storage chamber (41a, 41b, 41c, 41d), four stirring bevel gears (47) respectively corresponding to the positions of the first, second, third and fourth agent storage chamber (41a, 41b, 41c, 41d) are provided at a bottom of the multi-effect regulator (4) to drive a stirring rod assembly (5) to rotate, and an upper end of each stirring rod assembly (5) is connected with the first, second, third and fourth agent storage chamber (41a, 41b, 41c, 41d) by a fluid outlet connecting member (6) disposed at an inner bottom surface of the first, second, third and fourth agent storage chamber (41a, 41b, 41c, 41d) respectively, the stirring rod assembly (5) is hollow inside and is fixedly connected at a lower end to a spiral stirring rod (53), and is provided on a surface thereof above the spiral stirring rod (53) with a fluid outlet (51) for releasing the treating agent, is provided outside with a guide pipe (52) for guiding, the spring accumulator (42) is connected by an upper input shaft with the rotating blade (34), and is provided at the bottom surface with a main bevel gear (43), and a rotating motor (44) for rotation is provided at a center of an inner bottom surface of the multi-effect regulator (4) below the spring accumulator (42), the rotating motor (44) is, at a left side, connected with a telescopic motor rod (45) disposed between the main bevel gear (43) and the stirring bevel gear (47) for controlling the occlusion transmission by a connecting rod (46), and the telescopic motor rod (45) is transmitted at a left end to the stirring bevel gear (47) by a left driven bevel gear (451) and at a right end to the main bevel gear (43) by a right driven bevel gear (452), a stop motor rod (441) is provided at a top end of the rotating motor (44) for stopping the main bevel gear (43) such that the energy storage is conducted by the spring accumulator (42).

3. The apparatus according to claim 2, wherein the fluid outlet connecting member (6) comprises an upper fixing plate (61) fixedly connected to a top surface of the stirring rod assembly (5), a lower fixing plate (62) fixed to a bottom surface of the agent storage chamber and a fluid-control collar (63), and an inner side surface of the lower fixing plate (62) is respectively provided with an upper guiding ring (611) and a lower guiding ring (621), with the fluid-control collar (63) located therebetween for controlling the release of the treating agent, a plurality of fluid inlets 54 are evenly distributed on an upper outer peripheral wall of the stirring rod assembly (5) for flowing the treating agent into the stirring rod assembly (5) through the fluid inlets (54), a first magnetic strip (55) fitting for the fluid-control collar (63) is disposed below the fluid inlets (54), an inner side surface of the fluid-control collar (63) is provided with a sealing piece (631) and a second magnetic strip (633) corresponding to the position of the fluid inlets (54) and the first magnetic strip (55), a fluid passing port (632) is provided between each two seals (631) for docking with the fluid inlets (54) to flow the treating agent into the stirring rod assembly (5), a top surface and a lower bottom surface of the fluid-control collar (63) are both provided with a sliding slot (64) configured to matching with a slider (65) provided at the corresponding position of the upper guiding ring (611) and the lower guiding ring (621) for docking with the fluid passing port (632) and the fluid inlets (54) by a stopping point that allows the fluid-control collar (63) to rotate.

4. Apparatus according to claim 2, further comprising a second loading head (8), wherein the first loading head (3) at the upper end of the multi-effect treatment device (1) is also replaceable with the second loading head (8), a bottom central surface of the second loading head (8) is provided with a first control motor (81) for performing control of energy storage amount of the spring accumulator (42) according to the collected data, a second water pollution detecting sensor (82) is disposed at a center of a top surface of the first control motor (81), and is provided on outer circumference with a first water pressure sensor (83) for detecting the water storage pressure, the second loading head (8) is sequentially provided, at outer circumference with a first, second, third and fourth water control chamber (35a, 35b, 35c, 35d) for opening the corresponding chamber according to the classification of wastewater, and on the inner side, with a first, second, third and fourth interface (36a, 36b, 36c, 36d), for docking with the corresponding water inlet of the multi-effect treatment device (1).

5. The apparatus according to claim 4, wherein an upper end of the second loading head (8) is provided with a filter cover (7), respectively, for filtering large particle impurities in the wastewater.

6. The apparatus according to claim 4, wherein a top surface of the multi-effect treatment device (1) is provided with a plurality of positioning pins (18), and the second loading head (8) is provided at a top surface of the upper mounting fitting groove (38) with a positioning groove (37) corresponding to the amount and position of the positioning pin (18).

7. The apparatus according to claim 2, further comprising a third loading head (9), wherein the first loading head (3) at the upper end of the multi-effect treatment device (1) is also replaceable with the third loading head (9), a bottom central surface of the third loading head (9) is provided with a second control motor (91) for performing control of energy storage amount of the spring accumulator (42) according to the collected data, and the third loading head (9) is provided on outer circumference with a first, second, third and fourth water control chamber (35a, 35b, 35c, 35d) for opening the corresponding chamber according to the classification of the wastewater, and on the inner side, with a first, second, third and fourth interface (36a, 36b, 36c, 36d) for docking with the corresponding water inlet of the multi-effect treatment device (1), and a space inside the third loading head (9) is divided into a first, second, third and fourth water storage chambers (93a, 93b, 93c, 93d) according to the corresponding positions of the first, second, third and fourth water control chamber (35a, 35b, 35c, 35d), contact surfaces between the second control motor (91) and the first, second, third and fourth water storage chambers (93a, 93b, 93c, 93d) are provided with a second water pressure sensor (92) for detecting the water storage pressure, and the first, second, third and fourth water control chamber (35a, 35b, 35c, 35d) is provided with a filter (94) respectively for filtering large particle impurities in the wastewater.

8. The apparatus according to claim 7, wherein a top surface of the multi-effect treatment device (1) is provided with a plurality of positioning pins (18), and the third loading head (9) is provided at a top surface of the upper mounting fitting groove (38) with a positioning groove (37) corresponding to the amount and position of the positioning pin (18).

9. The apparatus according to claim 1, wherein an upper end of the first loading head (3) is provided with a filter cover (7), respectively, for filtering large particle impurities in the wastewater.

10. The apparatus according to claim 1, wherein a top surface of the multi-effect treatment device (1) is provided with a plurality of positioning pins (18), and the first loading head (3) is provided at a top surface of the upper mounting fitting groove (38) with a positioning groove (37) corresponding to the amount and position of the positioning pin (18).

* * * * *